(12) United States Patent
Qu et al.

(10) Patent No.: US 9,171,319 B2
(45) Date of Patent: Oct. 27, 2015

(54) ANALYSIS SYSTEM AND METHOD USED TO CONSTRUCT SOCIAL STRUCTURES BASED ON DATA COLLECTED FROM MONITORED WEB PAGES

(75) Inventors: Yan Qu, Cupertino, CA (US); Chao Qin, Sunnyvale, CA (US); Manu Mukerji, Sunnyvale, CA (US); Nanda Kishore, Los Altos, CA (US)

(73) Assignee: FIFTH STREET FINANCE CORP., AS AGENT, White Plains, NY (US)

( * ) Notice: Subject to any disclaimer, the term of this patent is extended or adjusted under 35 U.S.C. 154(b) by 636 days.

(21) Appl. No.: 13/432,055

(22) Filed: Mar. 28, 2012

(65) Prior Publication Data

US 2013/0262653 A1 Oct. 3, 2013

(51) Int. Cl.
*G06F 15/177* (2006.01)
*G06Q 30/02* (2012.01)
*G06Q 50/00* (2012.01)
*G06F 11/30* (2006.01)

(52) U.S. Cl.
CPC ........ *G06Q 30/0254* (2013.01); *G06Q 30/0204* (2013.01); *G06Q 30/0277* (2013.01); *G06Q 50/01* (2013.01); *G06F 11/3065* (2013.01); *G06F 2201/875* (2013.01)

(58) Field of Classification Search
CPC ........................................... H04L 29/06
USPC .................. 709/223, 224, 225, 226
See application file for complete search history.

(56) References Cited

U.S. PATENT DOCUMENTS

| 6,393,407 | B1 * | 5/2002 | Middleton et al. | 705/14.73 |
|---|---|---|---|---|
| 8,583,775 | B2 * | 11/2013 | Lu et al. | 709/223 |
| 8,626,823 | B2 * | 1/2014 | Kumar | 709/203 |
| 8,924,465 | B1 * | 12/2014 | Tunguz-Zawislak | 709/203 |
| 2008/0244053 | A1 * | 10/2008 | Sampson et al. | 709/223 |
| 2009/0106822 | A1 * | 4/2009 | Obasanjo et al. | 726/4 |
| 2009/0319538 | A1 * | 12/2009 | Bean | 707/10 |
| 2011/0208585 | A1 * | 8/2011 | Daboll et al. | 705/14.53 |
| 2012/0303552 | A1 * | 11/2012 | Zayas et al. | 705/400 |
| 2012/0310929 | A1 * | 12/2012 | Patterson et al. | 707/728 |
| 2012/0331067 | A1 * | 12/2012 | Richter et al. | 709/206 |

* cited by examiner

*Primary Examiner* — Hassan Kizou
*Assistant Examiner* — Abdelnabi Musa
(74) *Attorney, Agent, or Firm* — Sughrue Mion, PLLC

(57) ABSTRACT

Embodiments of a method for determining a mapping are illustrated. In an embodiment, the method includes receiving a log record from a tracking component that is located on a plurality of web pages. The method further includes determining a first mapping between a plurality of anchors associated with the plurality of users. The method also includes determining a second mapping between the plurality of users based on the first mapping.

23 Claims, 16 Drawing Sheets

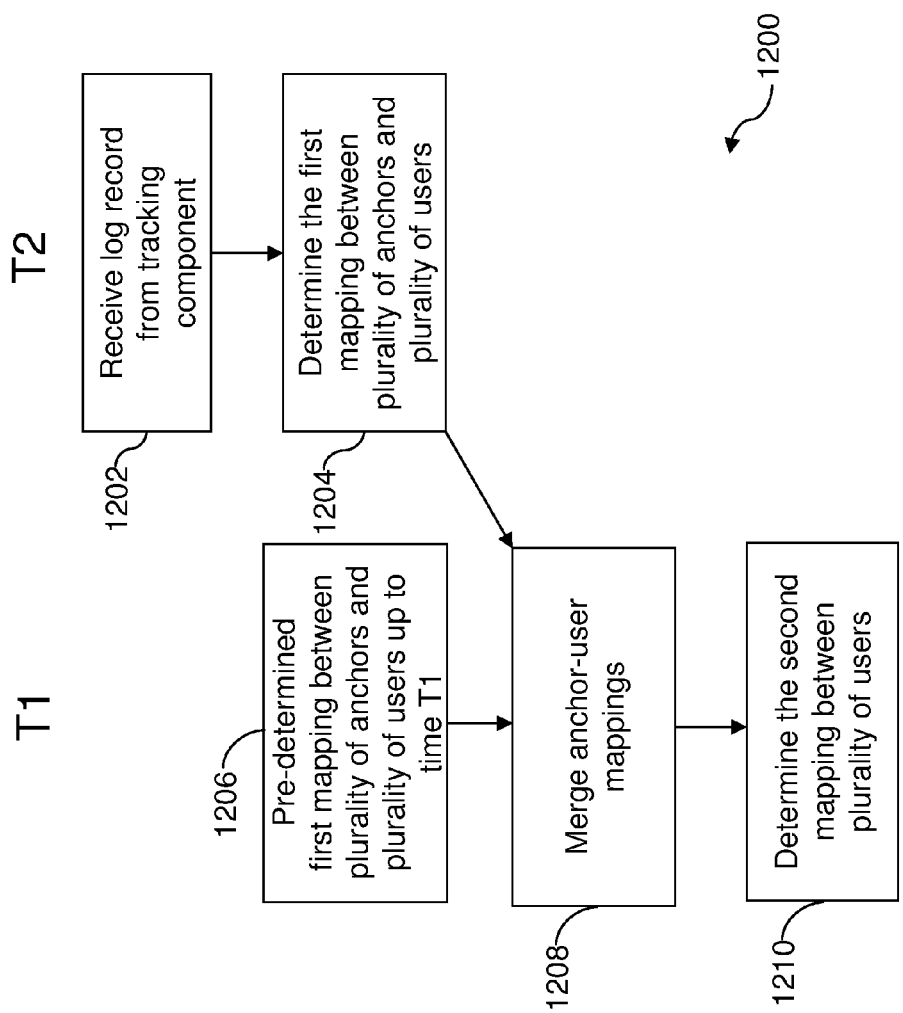

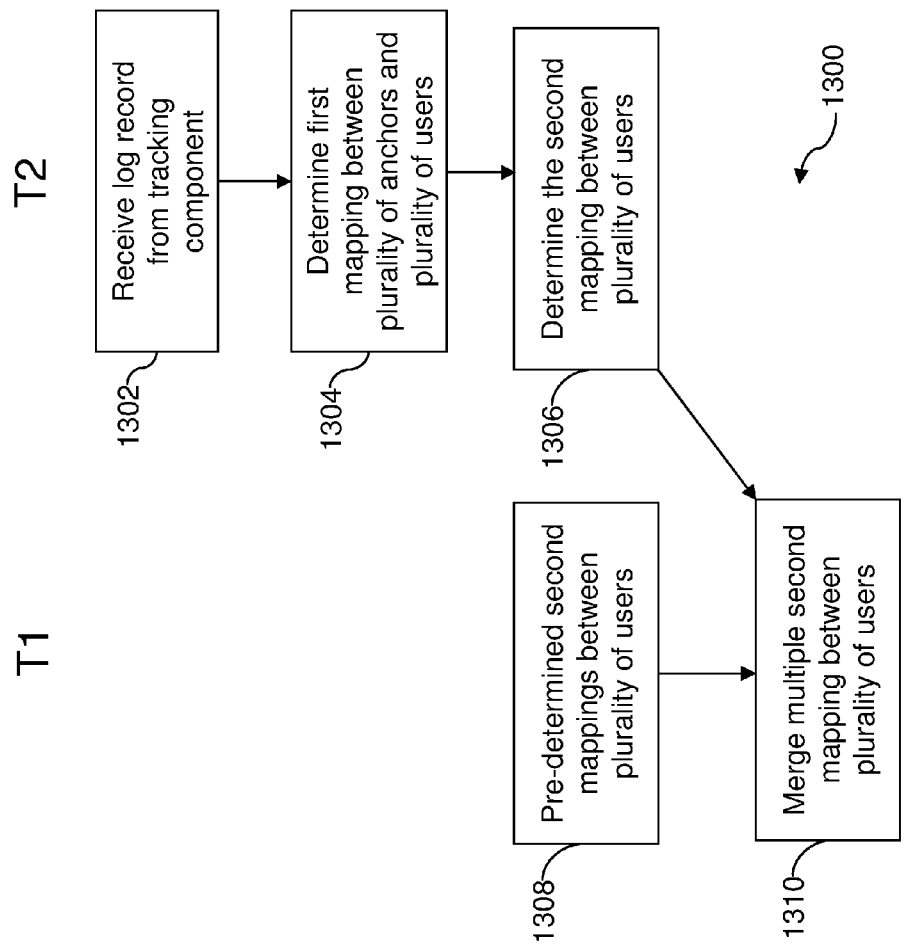

ANALYSIS SYSTEM AND METHOD USED TO CONSTRUCT SOCIAL STRUCTURES BASED ON DATA COLLECTED FROM MONITORED WEB PAGES

TECHNICAL FIELD

The present disclosure relates, in general, to a data collection and analysis system. More specifically, the present disclosure relates to a data collection system and analysis system used to construct social structures.

BACKGROUND

Global Internet usage has seen multifold growth due to exponential increase in number of Internet users. At any instant in time, there may be millions of users involved in various activities on the Internet. Such activities can include, but are not limited to, searching for content, visiting a web page, viewing a video blog, social networking, listening to an audio file, shopping online, gaming online, sharing content, following friends or celebrities, and downloading content. Such user activities may be indicative of a user's interest and/or online behavioral pattern.

SUMMARY

Embodiments of a method for determining a mapping between a plurality of users accessing a plurality of web pages are disclosed. In an embodiment, the method includes receiving at least one log record from a tracking component located on the plurality of web pages. The at least one log record corresponds to one or more activities of the plurality of users on the plurality of web pages. The method further includes determining a first mapping between a plurality of information anchors on the plurality of web pages and the plurality of users based on the corresponding user activities. The plurality of information anchors are utilized to perform the one or more user activities such as, but are not limited to, viewing the web page and sharing through the tracking component. The method includes determining a second mapping between the plurality of users based on the first mapping. The second mapping includes a plurality of nodes and a plurality of edges connecting the nodes. The plurality of nodes represents the plurality of users and the plurality of edges represents the plurality of information anchors.

BRIEF DESCRIPTION OF DRAWINGS

The following detailed description of the embodiments of the disclosed invention will be better understood when read with reference to the appended drawings. The invention is illustrated by way of example, and is not limited by the accompanying figures, in which like references indicate similar elements.

FIG. 12 illustrates a method of constructing a social structure incrementally in accordance with an embodiment; and FIG. 13 illustrates an alternative method of constructing a social structure incrementally in accordance with yet another embodiment.

DETAILED DESCRIPTION

Figure 1:
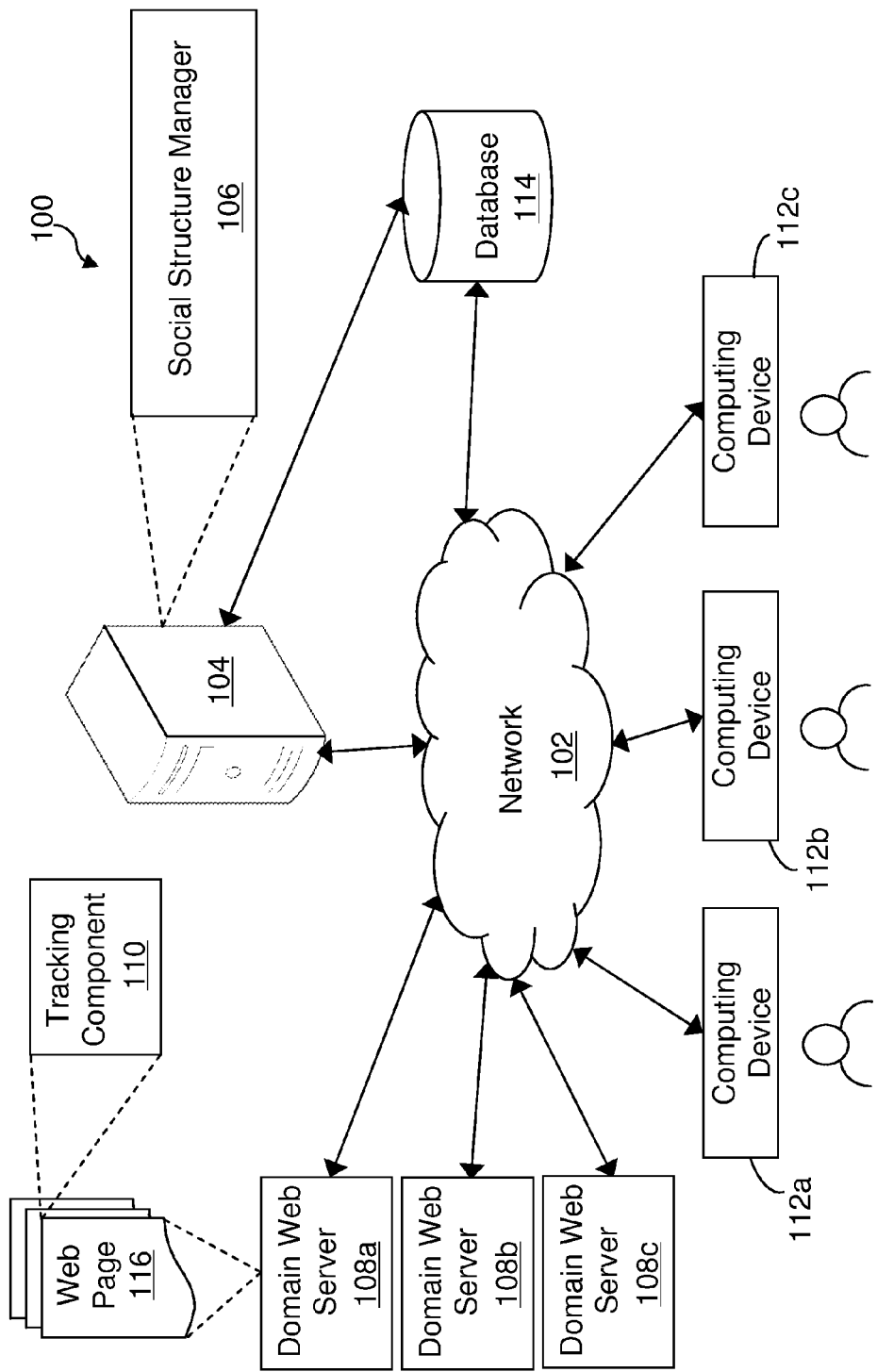
FIG. 1 illustrates a system environment in which the present disclosure can be implemented.

The present disclosure can be best understood when read with reference to the detailed figures and description set forth herein. Various embodiments are discussed below with reference to the figures. However, those skilled in the art will readily appreciate that the detailed description given herein with respect to these figures is just for explanatory purposes as methods and systems of the invention extend beyond the described embodiments. For example, those skilled in the art will appreciate that, in light of the teachings presented, multiple alternative and suitable approaches can be recognized, depending on the needs of a particular application, to implement the functionality of any detail described herein.

DEFINITION OF TERMS

Social structure: A social structure corresponds to a structure that represents a social relationship between users or user interactions. An example implementation of a social structure can be a social graph.

Social graph: A social graph corresponds to a graphical representation of links prevailing between users. The links are indicative of user relations, such as sharing of similar interest (e.g. an interest graph), proximity of locations (e.g. location-based social networks), or communication connections (e.g. email networks).

Sharing graph: A sharing graph, a type of social graph, corresponds to a graphical representation of links prevailing between sharers and clickers (defined below). The sharing graph is indicative of a relationship between the sharers and the clickers. The sharing graph includes nodes and edges. The nodes represent users and the edges represent anchors connecting the users. For purposes of the ongoing description, a cookie can also represent a user.

Channel: A channel corresponds to a website through which a sharing activity or a clicking activity takes places. For example, www.facebook.com represents a social networking channel, Facebook®.

Tracking URL: A tracking Unified Resource Locator (URL) corresponds to a URL that has the capability to encode information to identify unique user events such as sharing and clicking events. For instance, the tracking URL can be useful to track the user who shares a URL and those who respond to the shared URL. An example of the tracking URL is a shortened URL.

Shortened URL: A shortened URL corresponds to a URL that is shorter in length but leads a user to a webpage associated with the shortened URL. For example, the URL http://en.x11y22z33.org/mobile/models/sjagwsed can be shortened to http://shar.es/HMiPz. In an instance, there can be a number of shortened URLs that can be generated for a particular URL. In such cases, the shortened URLs can be used for tracking and identifying unique user events as they encapsulate the information about a sharer, a sharing channel used by the sharer for sharing and a sharing time. Examples of a shortened URL include, but are not limited to, a shar.es URL (a program available from ShareThis® for shortening a URL), and a hashed URL.

Sharer: A sharer corresponds to a user or a node that performs an operation of sharing a particular information entity (e.g., a URL, a shortened URL of a web page, or copy and paste text snippets) with a plurality of users. For example, a sharer may correspond to a cookie representing a user. A sharer is interchangeably referred to as an information sharer.

Share frequency: A share frequency corresponds to a frequency at which the users share the particular information entity.

Clicker: A clicker corresponds to a user or a node that performs an operation of clicking on a URL shared by a sharer on a web page. For example, a clicker may correspond to a cookie representing a user. In most cases, the clicker performs the operation of clicking on a shortened URL of the URL that is shared by the sharer. A clicker may also be referred to as an information responder.

Information anchor: An information anchor corresponds to data that determines the link between an information sharer and an information responder. For example, an information anchor may correspond to a shortened URL, a shared URL, an event tracking URL, a copy and paste text snippet, an interest topic, etc. An information anchor is interchangeably referred to as an anchor.

Click back time: Click back time corresponds to a lag in time that occurs between a time of share of a particular URL and a time of click back of the particular URL.

Tracking application: A tracking application corresponds to a software application which when installed on a web server results in an embedded tracking component in a web page hosted by the web server.

Tracking component: A tracking component is a web-based component that is part of a web page configured to gather log records. The log records facilitate tracking of a user activity. Examples of the log record may include, but are not limited to, an anonymous cookie representing one or more users, a timestamp, an event type, a sharing channel, a content identifier, a domain information, and a browser agent. Examples of the tracking component include, but are not limited to, a widget, a button, a hypertext, a web beacon and a link.

User activity: A user activity corresponds to the activities of the user on a web page. Examples of user activities include, but are not limited to, viewing a web page and sharing the webpage through a tracking component. The user activities are stored as user activity data that has users represented as cookies.

FIG. 1 illustrates a system environment 100 in which the present disclosure can be implemented. The system environment 100 includes a network 102, a web analytic server 104, a social structure manager 106, a plurality of domain web servers 108a, 108b and 108c (hereinafter referred to as domain web server 108) and a tracking component 110. The system environment 100 further includes a plurality of computing devices 112a, 112b and 112c (generally referred to as computing device 112), a database 114 and a plurality of web pages 116. Each of the plurality of domain web servers (such as the domain web server 108) hosts a plurality of web pages 116. Each of the plurality of web pages 116 comprises at least one tracking component 110.

The network 102 corresponds to a medium through which content and messages flow between the various components (e.g. the computing device 112, the web analytic server 104, the database 114, and the domain web server 108) of the system environment 100. Examples of the network 102 may include, but are not limited to, a television broadcasting system, an IPTV network, a Wireless Fidelity (Wi-Fi) network, a Wireless Area Network (WAN), a Local Area Network (LAN) or a Metropolitan Area Network (MAN). Various devices in the system environment 100 can connect to the network 102 in accordance with various wired and wireless communication protocols such as Transmission Control Protocol and Internet Protocol (TCP/IP), User Datagram Protocol (UDP) and 2G, 3G or 4 G communication protocols.

In an embodiment, the web analytic server 104 corresponds to a web analytic system with capabilities to extract and analyze data for commercial purposes. Further, the web analytic server 104 includes various analytical tools, such as the social structure manager 106, configured for uncovering relationship between users related to a sharing event in a networked environment and for constructing a social structure. Such analytical tools may further include, but are not limited to, a tracking tool, a social behavior analytic tool, a social influence analytic tool, an audience segmentation tool, a user modeling tool, a campaign analytic tool, a campaign optimization tool and a geographical sharing map generation tool.

In an embodiment, the social structure manager 106 determines a second mapping. (In this application, second mapping refers to a mapping between the users and a first mapping refers to a mapping between an anchor and a user). In another embodiment, the social structure manager 106 constructs a social structure. Further, the web analytic server 104 may extract data using various programming languages, such as Structured Query Language (SQL), 4D Query Language (4D QL), Object Query Language (OQL), and Stack Based Query Language (SBQL).

The domain web server 108 may correspond to a data storage system that has the capability of storing the plurality of web pages 116. In an embodiment, the domain web server 108 hosts one or more of the web pages corresponding to a plurality of content publishers or a plurality of content providers. Examples of the plurality of content providers may include, but are not limited to, forbes.com and mashable.com. Examples of the plurality of content publishers include, but are not limited to, Facebook®, LinkedIn® and Stumble Upon®.

In an embodiment, the plurality of content publishers, also referred to as social channels in this disclosure, are the receivers of the sharing enabled by the tracking component 110. In an embodiment, a sharer shares a URL to a social channel and a clicker clicks on the shared URL that lead the clicker to a web page of a content publisher.

In an embodiment, the domain web server 108 subscribes to the web analytic server 104 for one or more web analytic services. A web service provider via the web analytic server 104 may host such services. Such web analytic services may include analysis based on the preferences of a target audience, analysis based on an influential power of a user on the other users, analysis based on users with similar preferences, sales conversion analysis, and social quality index analysis for domain ranking. The web page includes the tracking component 110.

The computing device 112 may correspond to a device capable of receiving an input from a user on a user interface displayed on a display screen. Examples of the computing device 112 may include, but are not limited to, laptops, televisions, tablet computers, desktops, mobile phones, gaming consoles, and other such devices with a display screen that displays the plurality of web pages 116. The computing device 112 includes one or more browsing applications that enable the user to browse through a web page. The user provides the input, for example a keyword, to navigate through the content on the web page. Although three computing devices have been shown in FIG. 1, it may be appreciated that the disclosed embodiments can be implemented for a larger or smaller number of computing devices. It may also be appreciated that for a larger number of computing devices, the web analytic server 104 may be implemented as a cluster of computing devices configured to jointly perform the functions of the web analytic server 104.

The database 114 corresponds to a storage device that stores data required to uncover relationships between users performing a user activity in a networked environment. For example, the database 114 can store information anchors associated with a plurality of users, tracking data, publisher data, social structure, content categorization data, tracking log, and user activity data. The database 114 can be implemented by using several technologies that are well known to those skilled in the art. Some examples of technologies include, but are not limited to, Amazon Simple Storage Service (Amazon S3), Apache Hadoop™, Apache Hive™ and Apache PIG™.

In operation, the plurality of domain owners download and install a tracking application in their respective domain web server 108. The tracking component 110 tracks and gathers log records. The tracking component 110 is configured to send the log records in real time to the web analytic server 104 and the database 114.

In an embodiment, the database 114 includes a huge data storage bank that stores the log records corresponding to one or more activities of the plurality of users on a web page related to the domain web server 108.

In an embodiment, the web analytic server 104 determines the second mapping based on the first mapping. The second mapping is determined using one or more of a user mapping data, the log records and the data stored in the database 114.

Figure 2:
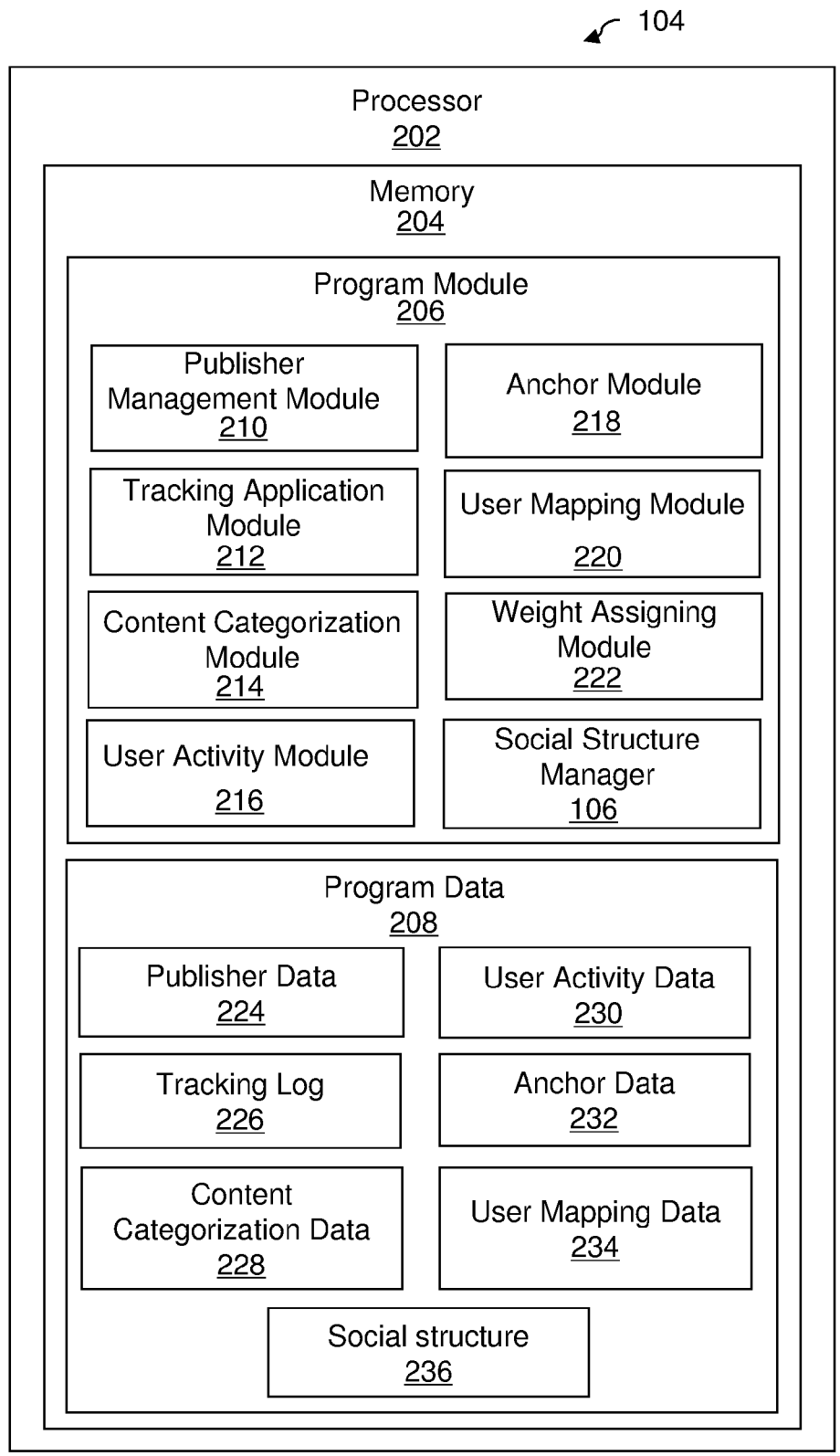
FIG. 2 illustrates an exemplary system diagram showing various modules involved in operations of a web analytic server in accordance with an embodiment.

FIG. 2 is explained in conjunction with FIG. 1. FIG. 2 illustrates an exemplary system diagram showing various modules involved in the operations of the web analytic server 104 in accordance with an embodiment. The web analytic server 104 includes a processor 202 and a memory 204. The processor 202 fetches and executes a set of instructions stored in the memory 204. The processor 202 can be realized through a number of processor technologies known in the art. Examples of the processor 202 can be X86 processor, RISC processor, ASIC processor, CSIC processor, or any other processor. The memory 204 is configured to store a set of instructions or modules. Some of the commonly known memory 204 implementations can be, but are not limited to, a random access memory (RAM), read only memory (ROM), hard disk drive (HDD), and secure digital (SD) card.

Further, the memory 204 includes a program module 206 and a program data 208. The program module 206 includes a publisher management module 210, a tracking application module 212, a content categorization module 214, a user activity module 216, an anchor module 218, a user mapping module 220, a social structure manager 106 and a weight assigning module 222. The program data 208 includes publisher data 224, tracking log 226, content categorization data 228, user activity data 230, anchor data 232, user mapping data 234 and social structure 236.

The publisher management module 210 is configured to manage a subscription of the domain web server 108. The publisher management module 210 stores the subscription information related to the plurality of content publishers or content providers or domain owners as the publisher data 224. Examples of the subscription information include, but are not limited to, details of a publisher, date and time of the tracking application subscription, time of expiry of the subscription, and pages at which the tracking application is installed.

The tracking application module 212 is configured to provide the tracking application to the plurality of content publishers or content providers on a subscription basis. The tracking component 110 located on the plurality of web pages, is configured to receive the log records corresponding to the one or more activities of the plurality of users on the web page. Examples of the one or more activities of the plurality of users may include, but are not limited to, viewing a web page and sharing through the tracking component 110. Examples of the log record may include, but are not limited to, an anonymous cookie representing the one or more users, a time stamp, an event type, a sharing channel, a content identifier, a domain information, and a browser agent.

The social structure manager 106 is configured to gather the log records corresponding to the one or more activities of the plurality of users from the tracking component 110. Further, the social structure manager 106 stores the gathered log records as the tracking log 226.

In another embodiment, the social structure manager 106 is configured to gather the user mapping data 234 and determines the second mapping based at least in part on the one or more activities of the plurality of users and the anchor. Further, the social structure manager 106 stores the determined second mapping as the social structure 236. In another embodiment, the one or more activities of the plurality of users include sharing of content on the plurality of web pages 116 amongst the users.

Figure 3:
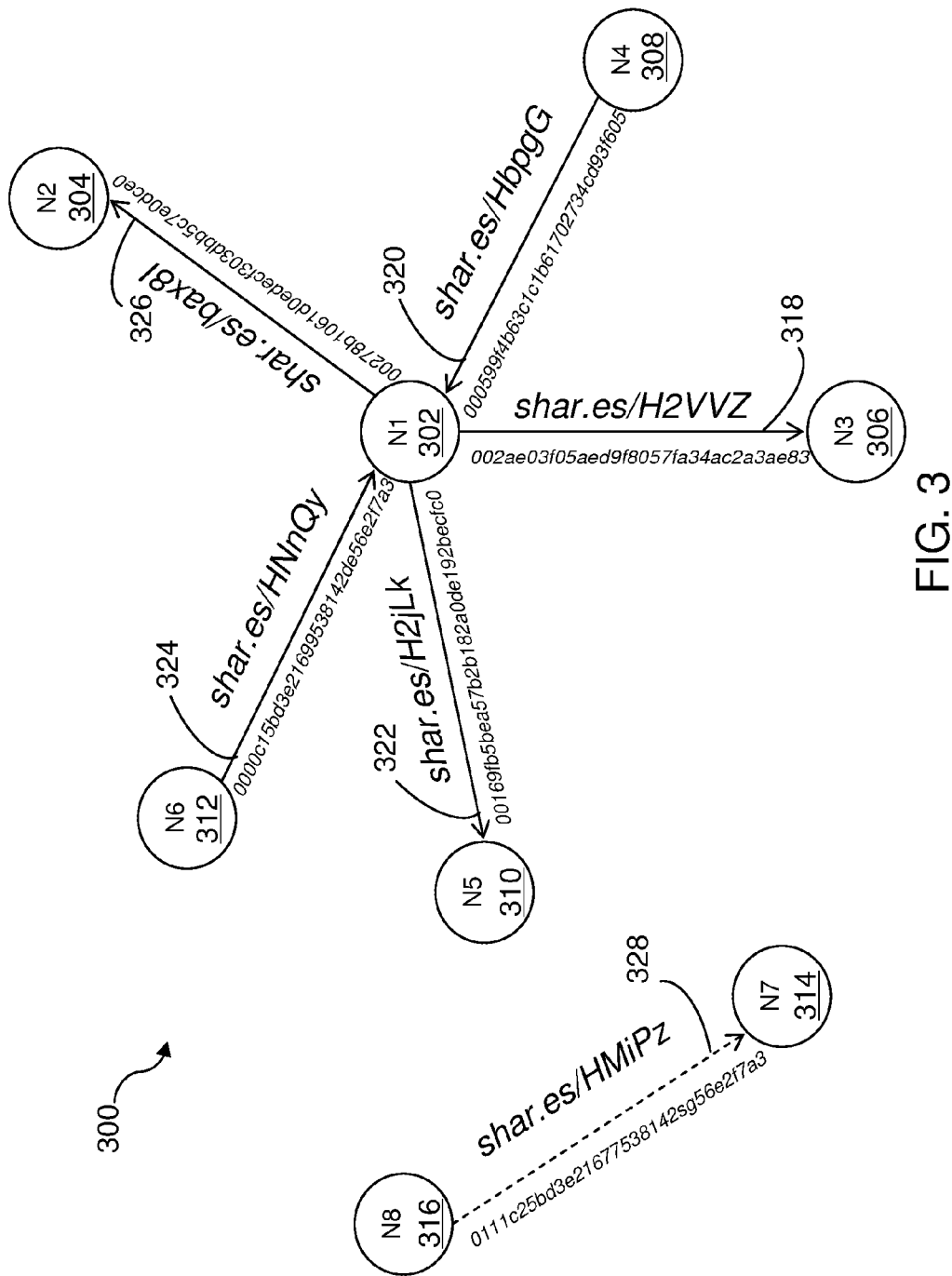
FIG. 3 illustrates a diagram showing a sharing graph in accordance with an embodiment.

In an embodiment, the second mapping can correspond to a social structure (e.g., sharing graph) that can be stored as the social structure 236. An exemplary sharing graph stored in the social structure 236 is shown in FIG. 3 and is described in more detail below.

In an embodiment, social structure manager 106 provides a dashboard for an administrator operating the web analytic server 104. Further, the social structure manager 106 can also include tools for analysis based on the log records, the social structure, etc. Social structure manager 106 can also be configured to graphically represent the second mapping and display on a user interface.

In another embodiment, the administrator can define a time window for determining the second mapping. For example, the administrator, with the use of the dashboard, can define a time window of a week, for which the second mapping can be determined.

In another embodiment, the social structure manager 106 instructs the weight assigning module 222 to assign numerical weights to graph edges. Further, the social structure manager 106 annotates the graph edges and the nodes with metadata. In another embodiment, the social structure manager 106 instructs the content categorization module 214 to categorize the content on a web page.

The content categorization module 214 is configured to categorize the content on the web page into one or more content categories based on the log records. Further, the categorized content is stored as the content categorization data 228.

The user activity module 216 determines the one or more activities of the plurality of users on the web page based on the log records. Further, the user activity module 216 stores the determined one or more activities of the plurality of users as the user activity data 230.

The anchor module 218 is configured to gather the log records from the tracking log 226. Further, the anchor module 218 determines an anchor on the web page based on the one or more activities, wherein the anchor is utilized to perform the one or more activities. Furthermore, the anchor module 218 stores the determined anchor as anchor data 232.

In an embodiment, the anchor module is configured to determine a plurality of anchors on the plurality of web pages based on the one or more activities. Further, the plurality of anchors is utilized to perform the one or more activities.

The user mapping module 220, determines a first mapping between the anchor on the web page and the user based on the corresponding user activity.

In an embodiment, the user mapping module 220 determines the first mapping based on the corresponding user activity and a content category amongst the one or more content categories. Further, the user mapping module 220 stores the first mapping as the user mapping data 234.

The weight assigning module 222 is configured to assign numerical weights to graph edges. In an embodiment, the numerical weights are assigning to an edge connecting any two nodes based at least in part on the activity of the two nodes. Further, the numerical weights are assigned to graph edges in order to quantify strength of connection between the nodes associated with the graph edges. The numerical weights may be viewed as one of the many possible ways of annotating the graph edges. For example, during the time window of determining the second mapping, if the numerical weights in the graph correspond to an event of clicking a URL by the user, then the event of assigning the weight of 2 to the edge of the graph would mean that there were two clicks performed by the user on the URL.

In another example, during the time window of determining the second mapping, if a clicker clicks back on two shar.es URLs shared by the same sharer, a numerical weight of 2 is automatically assigned to an edge connecting the sharer and the clicker. This helps in differentiating the aforesaid instance from the others where the clicker clicks back on only one or a significant number of shar.es URLs shared by the sharer.

In an embodiment, a weighted graph could be assigned threshold values such that the graph represents necessary information. For example, the weighted graph as discussed above may be assigned a threshold value of 2. In an embodiment, the weighted graph could be pruned by removing the edges associated with negligible weights such that the weighted graph represents precise information.

In the example above the users who clicked the URL once would not be shown in the weighted graph but the users who clicked the URL twice and more will be shown in the weighted graph. This helps in an effective representation of the necessary information in the weighted graph.

In an embodiment, assigning the numerical weights to the graph edges may be useful for applications such as, but not limited to, influencer modeling and link prediction (i.e. prediction of existence of links among users).

FIG. 3 illustrates an embodiment of a sharing graph 300 stored in the social structure 236. Accordingly, the sharing graph 300 includes a plurality of nodes, node N1 represented as 302, node N2 represented as 304, node N3 represented as 306, node N4 represented as 308, node N5 represented as 310, node N6 represented as 312, node N7 represented as 314, and node N8 represented as 316. The plurality of nodes 302, 304, 306, 308, 310, 312, 314 and 316 are connected by a plurality of edges 318, 320, 322, 324, 326 and 328. The node 306 is connected to the node 302 by the edge 318. The node 308 is connected to the node 302 by the edge 320. The node 310 is connected to the node 302 by the edge 322. The node 312 is connected to the node 302 by the edge 324. The node 304 is connected to the node 302 by the edge 326. The node 316 is connected to the node 314 by the edge 328. (In this application, the nodes represent users and the edges represent anchors connecting the users).

In an embodiment, each of the plurality of edges 318, 320, 322, 324, 326 and 328 represent an anchor.

In another embodiment, the nodes 304, 306, 310 and 314 perform an operation of sharing on a web page. Therefore, the nodes 304, 306, 310 and 314 are information sharers. In another embodiment, the nodes 308, 312, and 316 perform the operation of clicking on the web page. Therefore, the nodes 308, 312 and 316 are information responders. Further, the node 302 performs the operation of both sharing and clicking on the web page. For example, the node 302 shares a link associated with a web page with the users, such as the nodes 308 and 312. The node 302 clicks on a link associated with a web page that is shared by the nodes 304, 306 and 310. Therefore, the node 302 is an information sharer and an information responder.

In an embodiment, a shar.es URL associated with an event of sharing or an event of clicking performed by the plurality of users is associated with the plurality of edges connecting any two nodes. For example, the edge 326 has a shar.es URL "shar.es/bax81" associated with it. The shar.es URL acts as the anchor in order to link the information sharer and the information responder. An alternative type of the anchor is illustrated by a hashed URL on the edges in FIG. 3, such as "000599f4b63c1c1b61702734cd93f605" (for the edge 320), "00169fb5bea57b2b182a0de192becfc0" (for the edge 322). In other words, the shar.es URL determines the link between the nodes involved in the event of sharing, clicking or both. For example, the shar.es URL of the clicking event performed by the node 308 (clicker) is "shar.es/HbpgG". The shar.es URL helps in tracking the node 302 (sharer) connected with the node 308 (clicker).

On the other hand, the node 314 is a sharer that shared a shar.es URL "shar.es/HMiPz" to some user. But it is most unlikely to determine who clicked on the shar.es URL shared by the node 314 since the sharing event took place via a social networking website or any other website that does not disclose the identities of a user among the plurality of users. For example, some social channels have an opt-out option that the user can choose to avoid being tracked. In the example, the user (e.g., node 316) who clicked on the shar.es URL shared by the node 314 is an anonymous user.

In an embodiment, the sharing graph 300 as shown in FIG. 3 can have both the nodes and the edges annotated with additional metadata. The nodes can be annotated with metadata such as, but not limited to, user interests and/or user activities. The edges can be annotated with metadata such as, but not limited to, category information for the anchor and/or relationship between users, etc so that the sharing graph 300 can include more information for later use. The embodiment of annotating the sharing graph 300 with metadata will be explained later.

Figure 4:
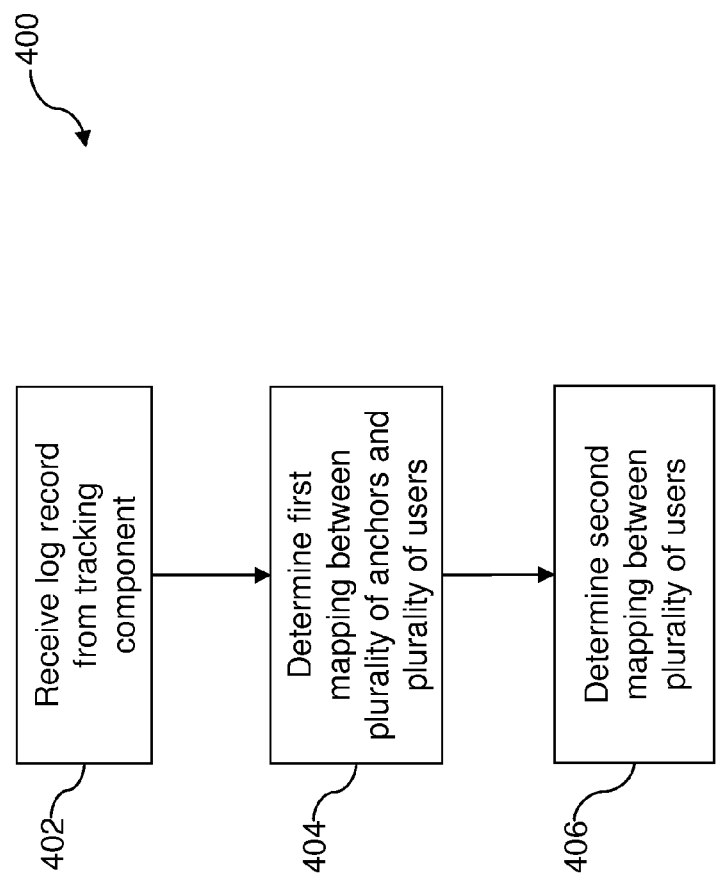
FIG. 4 illustrates a flowchart showing a method for determining a mapping in accordance with an embodiment.

FIG. 4 shows a flowchart illustrating a method for determining a mapping between a plurality of users accessing a plurality of web pages, in accordance with an embodiment. FIG. 4 will be explained in conjunction with FIG. 1 and FIG. 2.

At step 402, log records are received from the tracking component 110. The social structure manager 106 receives the log records from the tracking component and stores it at the database 114. In an alternate embodiment, the social structure manager 106 retrieves the log records from the database 114 and stores it as the tracking log 226. The log record corresponds to the one or more activities of the plurality of users.

In an embodiment, the step 402 includes categorizing the content on the web page into one or more content categories. The content categorization module 214 gathers data from the tracking log 226 and categorizes the content on the web page associated with the corresponding log records into the one or more content categories based on the log records. In another embodiment, the content categorization module 214 stores the categorized content as the content categorization data 228.

In an embodiment, the step 402 further includes determining the one or more activities of the plurality of users on the web page. The user activity module 216 retrieves the content categorization data 228 and determines the one or more activities of the plurality of users on the web page based on the log records. In another embodiment, the user activity module 216 stores the determined one or more activities of the plurality of users as the user activity data 230.

In yet another embodiment, the step 402 further includes determining the anchor on the web page. The anchor module 218 retrieves the tracking log 226 and determines the anchor on the web page based on the one or more activities. The anchor is utilized to perform the one or more activities. In another embodiment, the anchor module 218 stores the determined anchor as anchor data 232.

At step 404, the first mapping is determined by the user mapping module 220 between the anchor on the web page and the user based on the corresponding user activity. The first mapping is determined between the anchor data 232 and the user activity data 230. It is evident to a person skilled in the art that a share cookie represents a sharer and a click cookie represents a clicker. In an embodiment, share cookies and click cookies are grouped together by Unified Resource Locator (URL), as shown in FIG. 5.

Figure 5:
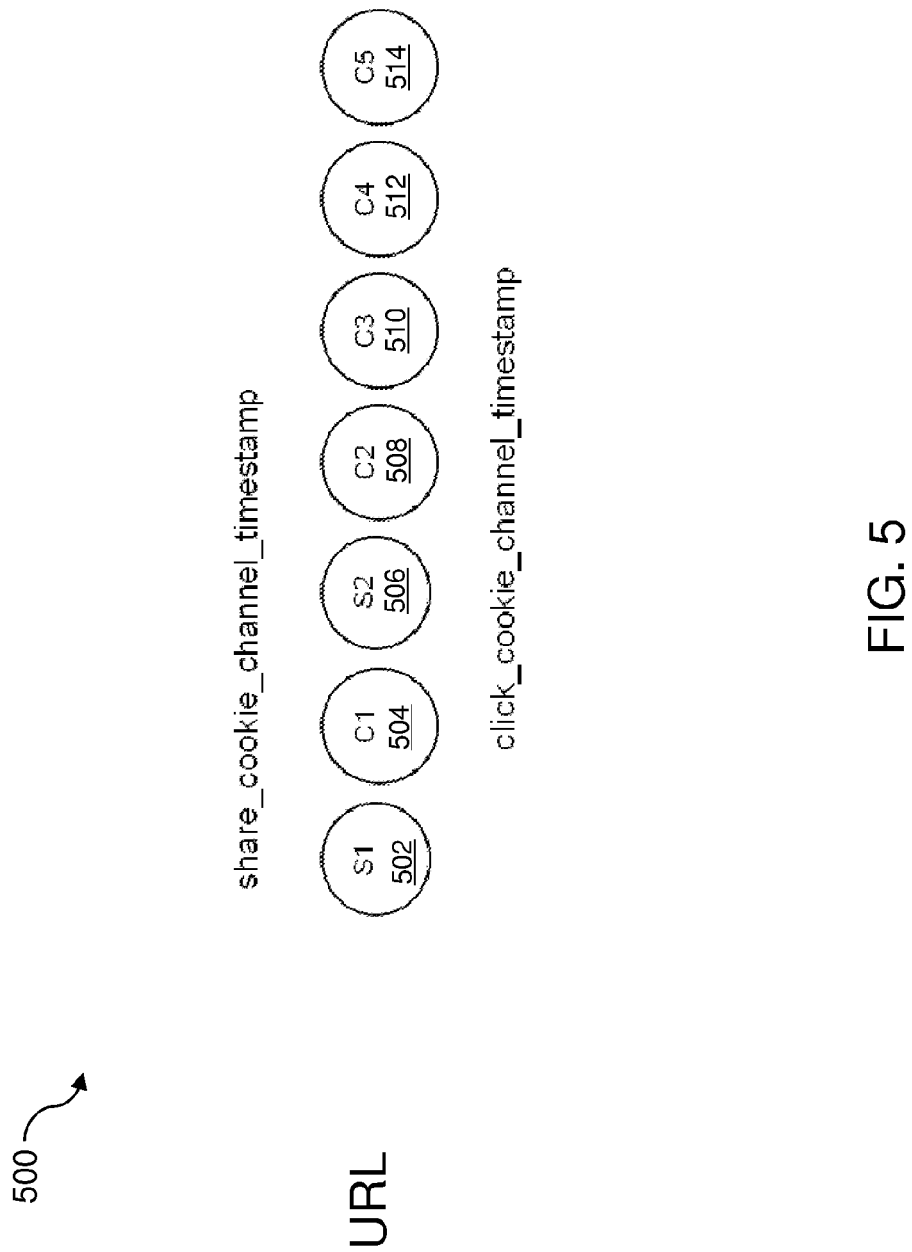
FIG. 5 illustrates grouping share and click cookies by Unified Resource Locator (URL) in accordance with an embodiment.

FIG. 5 shows share cookies S1 represented as 502 and S2 represented as 506. Further, FIG. 5 shows click cookies C1 represented as 504, C2 represented as 508, C3 represented as 510, C4 represented as 512, and C5 represented as 514. In an embodiment, the share cookies (502 and 506) can have fields such as, but not limited to, a label for a share event, a label for a share cookie, a label for a share channel and a label for a share time. The click cookies (504, 508, 510, 512, and 514) can have fields such as, but not limited to, a label for a click event, a label for a click cookie, a label for a click channel and a label for a click time. In an embodiment, FIG. 5 shows the field "share cookie channel timestamp" and the field "click cookie channel timestamp" respectively associated with the share cookies (such as 502 and 506) and the click cookies (such as 504, 508, 510, 512, and 514).

In an embodiment, the first mapping is based on the corresponding user activity and the content category amongst the one or more content categories.

In an embodiment, the first mapping determined between the plurality of anchors and the plurality of users is performed irrespective of any interest topic or content category. Therefore, it can be interpreted as a top-level mapping. Further, the top-level mapping can be extended to represent a more specified set of users by extending the first mapping between the plurality of anchors and the plurality of users with the category information of the plurality of anchors. Consequently, the second mapping determined between the plurality of users will be determined based on the first mapping related to the category information. This leads to a more precise representation of a social structure.

Further, the first mapping is stored as the user mapping data 234. The step of determining the second mapping is explained in step 406.

Figure 6A:
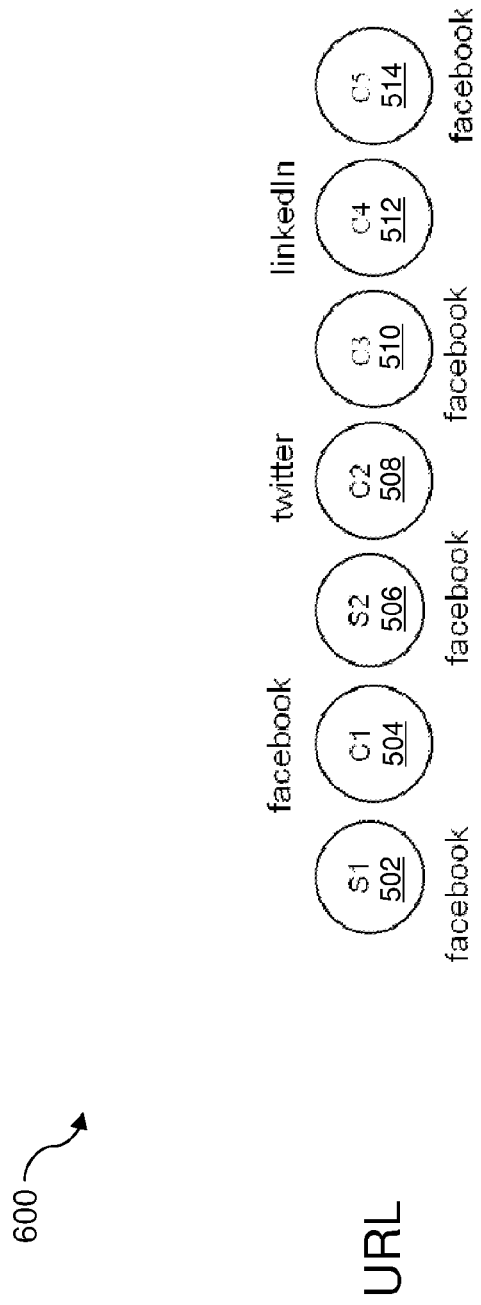
FIG. 6*a* illustrates an input information received by a web analytic server for linking share and click cookies with respect to URL in accordance with an embodiment.
Figure 6B:
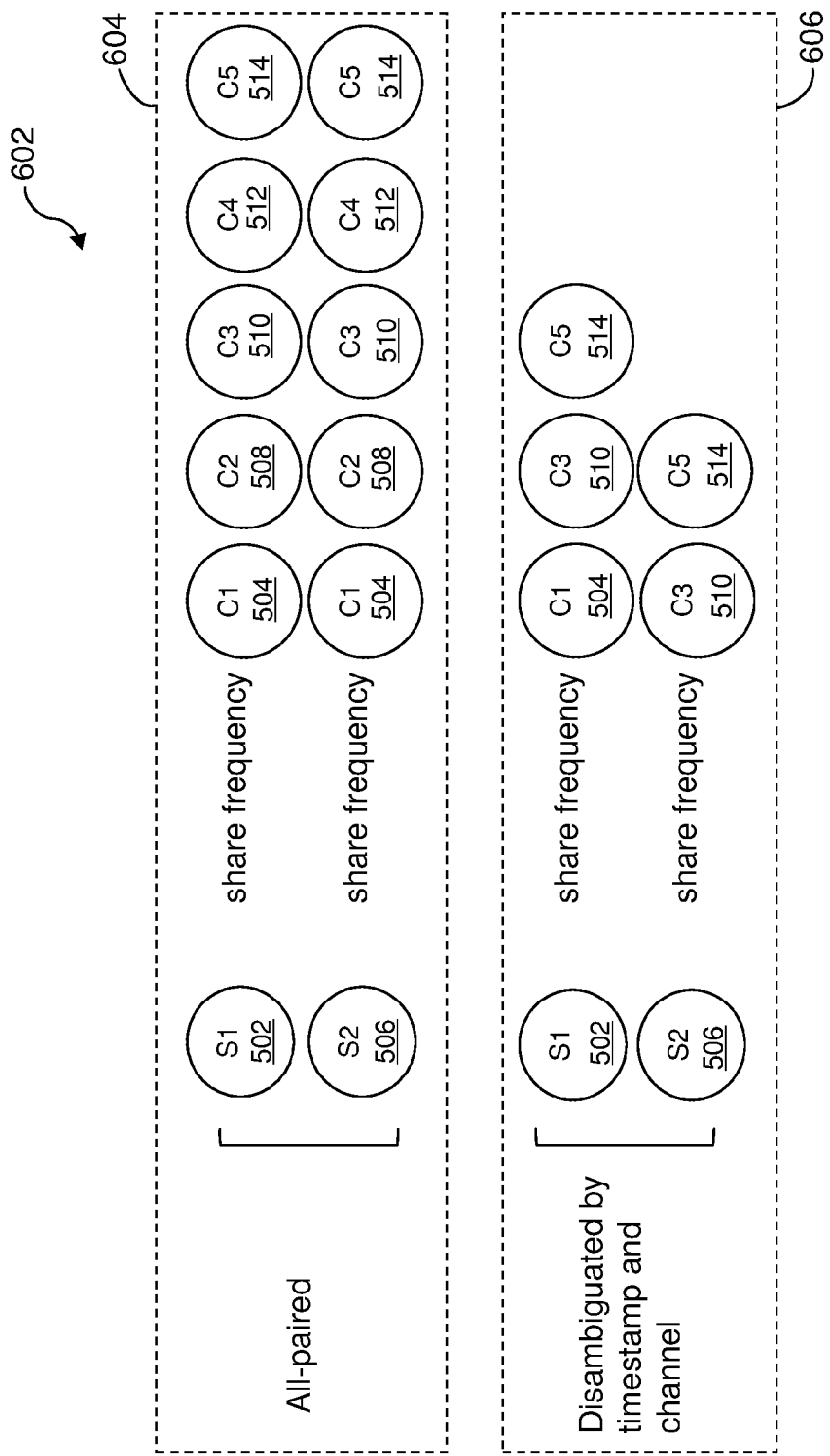
FIG. 6*b* illustrates an output cookie graph generated by a web analytic server by linking share and click cookies with respect to URL in accordance with an embodiment.

At step 406, the social structure manager 106 gathers data from the user mapping module 220, and determines the second mapping between the plurality of users by linking the share cookie with the corresponding click cookie and stores the second mapping as the social structure 236. The second mapping describes the relationship between a plurality of sharers and clickers based on the sharing or clicking event. In an embodiment, the one or more activities of the plurality of users include sharing of content on the web page amongst the users. FIG. 6*a* and FIG. 6*b* show an example of the linking made between the share cookie and the click cookie with respect to a URL.

FIG. 6*a* illustrates an input information 600 received by the web analytic server 104 for linking the share cookies with the click cookies with respect to the URL in accordance with an embodiment. Further, FIG. 6*a* is explained in conjunction with FIG. 5. Further, FIG. 6*a* shows the label for a share channel, such as Facebook®, Twitter® and LinkedIn® associated with the share cookies and the click cookies. The share cookies 502, 506 and the click cookies 504, 508, 510, 512, 514 are linked using the tracking URL, in this case, the URL. FIG. 6*a* shows that the share cookies 502 and 506 shared the URL on Facebook®. The share channel (such as Facebook) is revealed from the label associated with the share cookies 502 and 504. Further, FIG. 6*a* shows that the click cookies 504, 510 and 514 clicked on the shar.es URL on Facebook®. The click cookie 508 clicked on the URL on Twitter® and the click cookie 512 clicked on the URL on LinkedIn®. The label for a click channel associated with the click cookies 504, 510 and 514 reveal that the URL was clicked on by the click cookies via Facebook®. The label for a click channel associated with the click cookie 508 reveals that the URL was clicked on by the click cookie via Twitter®. Further, the label for a click channel associated with the click cookie 512 reveals that the URL was clicked on by the click cookie via LinkedIn®.

FIG. 6*b* illustrates an output cookie graph 602 generated by the web analytic server 104 by linking the share cookies and the click cookies with respect to the URL in accordance with an embodiment. Further, FIG. 6*b* is explained in conjunction with FIG. 5. The web analytic server 104 processes the input information 600 and generates the output cookie graph 602. A block 604 represents an all-paired cookie graph where the share cookies 502 and 506 are respectively paired with all the click cookies 504, 508, 510, 512, 514. In an embodiment, the pairing is performed without the knowledge of a social channel that was used for sharing and without the knowledge of a time associated with the sharing. Therefore, there is an ambiguity associated with the output cookie graph represented by block 604 as the knowledge of the share channel is unknown. In order to eliminate the ambiguity, the share and the click cookies are linked together based on the timestamp of a sharing event and the sharing channel used. A block 606 represents the disambiguated links generated between the share cookies and the click cookies based on the channel and the timestamp used. In an embodiment, Facebook® is the channel through which the sharing and the clicking event took place where a certain timestamp was recorded. For example, the share cookie 502 shares the URL on Facebook®. The click cookies 504, 510, 514 click on the URL shared by the share cookie 502 on Facebook®. Therefore, the share cookie 502 is linked to the click cookies 504, 510 and 514 based on the sharing channel and a timestamp recorded during the occurrence of the sharing or clicking event. In another example, the share cookie 506 is linked to the click cookies 510 and 514 based on the sharing channel and a time stamp recorded during the occurrence of the sharing or clicking event. The disambiguation process during the generation of the output cookie graph 602 is further illustrated in FIG. 7.

Figure 7:
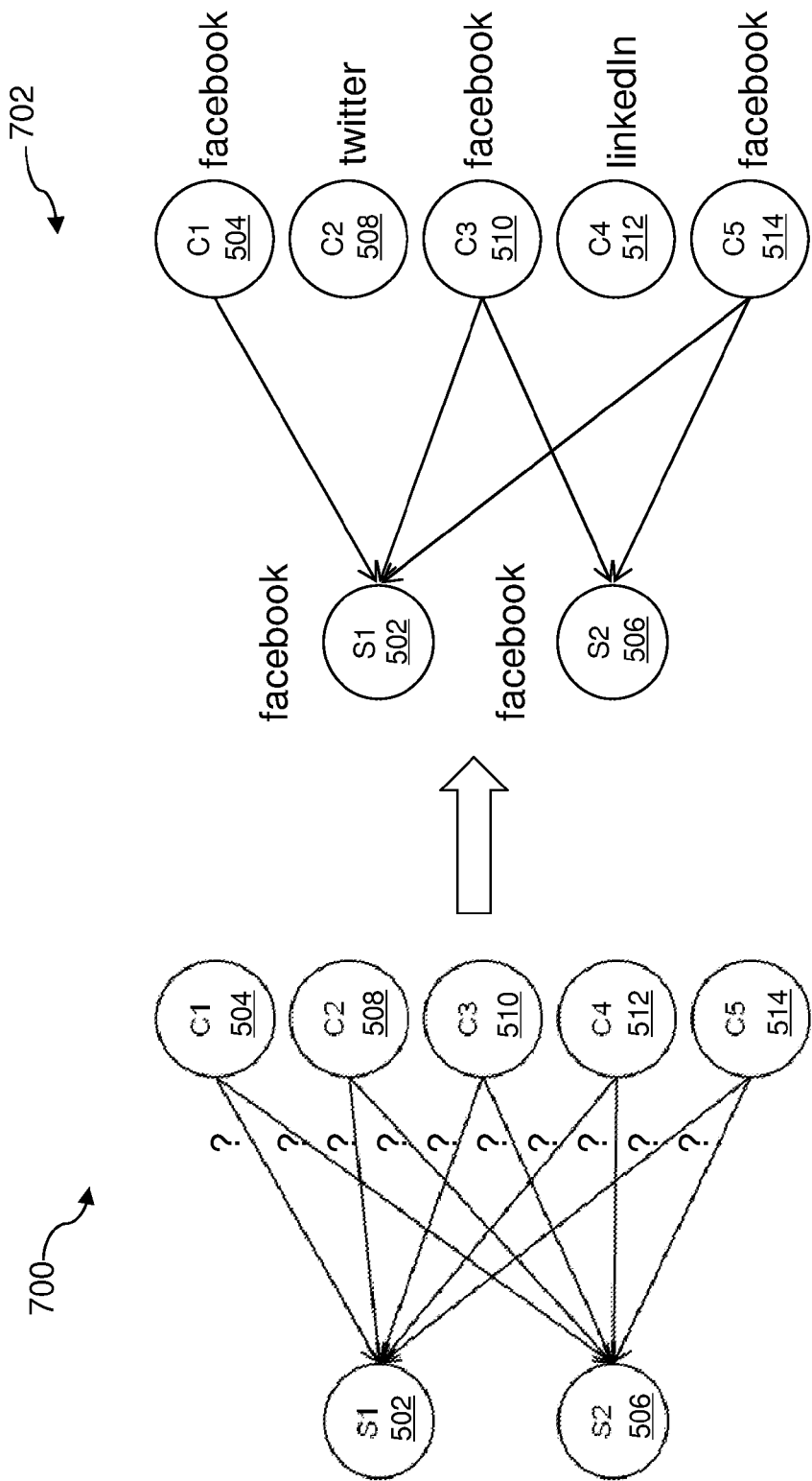
FIG. 7 illustrates a method of disambiguating links between share and click cookies by using URL as an anchor in accordance with an embodiment.

FIG. 7 illustrates a method of disambiguating links between share and click cookies by using URL as an anchor, in accordance with an embodiment. The elements shown in FIG. 6*b* are similar to the elements shown in FIG. 7. An all paired linkage shown in 604 (refer to FIG. 6*b*) is represented in the form of a graph 700 in FIG. 7. Disambiguated links generated between the share cookies and the click cookies based on the channel and the timestamp as shown in 606 (refer to FIG. 6*b*) is represented in the form of graph 702 in FIG. 7.

The graph 702 as shown in FIG. 7 could be incorporated with numerical weights such that a high degree of confidence on an edge between the sharer and the clicker can be achieved. This helps to reinforce reliable links between users.

Figure 8:
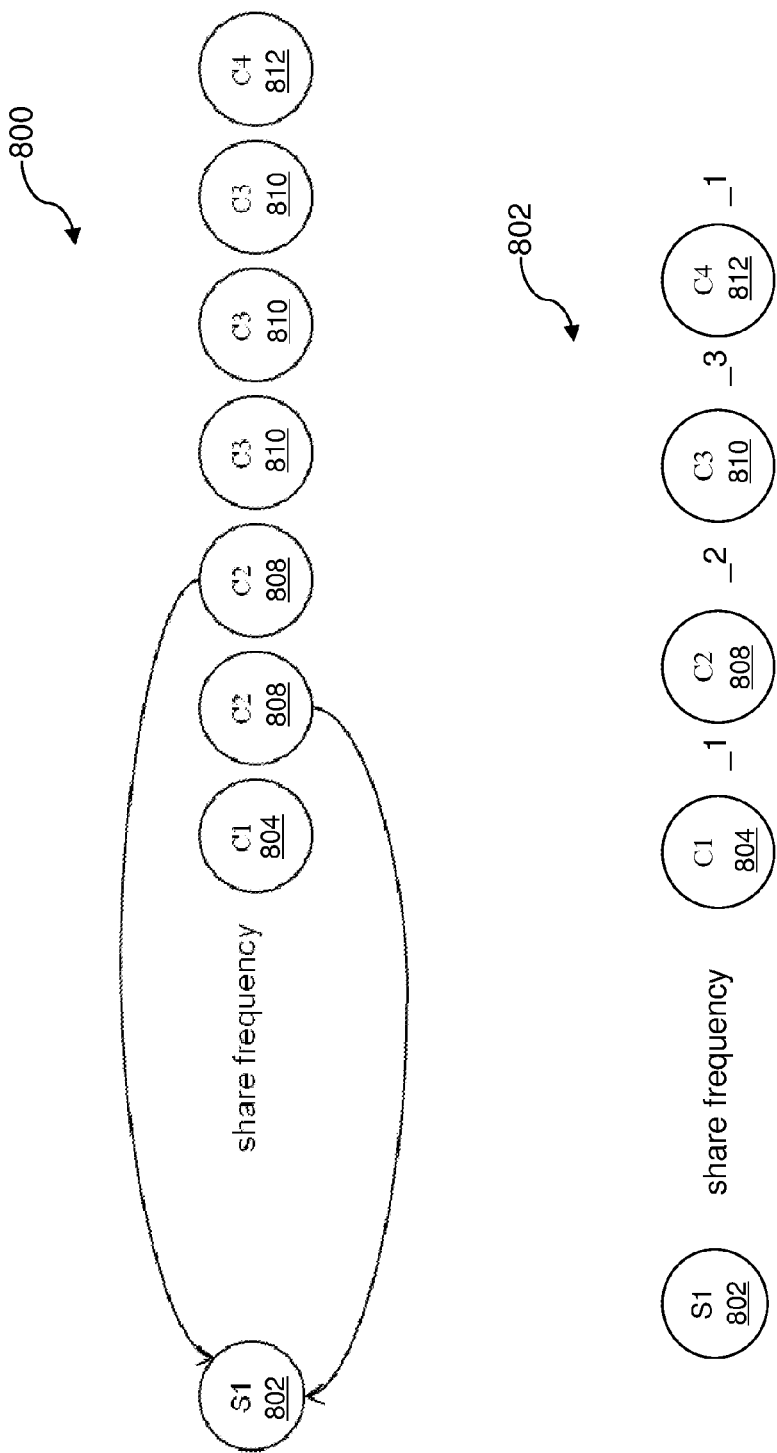
FIG. 8 illustrates a method of assigning numerical weights to graph edges in accordance with an embodiment.

FIG. 8 illustrates a method of assigning numerical weights to graph edges in accordance with an embodiment. FIG. 8 is shown to include a share cookie S1 represented as 804 and click cookies C1 represented as 806, C2 represented as 808, C3 represented as 810 and C4 represented as 812. In the embodiment shown in 800, the click cookies 806, 808, 810 and 812 have clicked on to the URL shared by the share cookie 804 through a certain channel. The click cookies 808 and 810 are shown to be repeated several times as they have clicked back the share cookie S1 several times. Therefore, an output 802 is generated which has the numerical weights added to the click cookies. In an embodiment, a measure of numerical weights is the frequency of clicks. Therefore, click cookies 806 and 812 are assigned a weight of 1 as they have clicked back the share cookie 804 once. The click cookie 808 is assigned a weight of 2 as it has clicked back the share cookie 804 twice. The click cookie 810 is assigned a weight of 3 as it has clicked back the share cookie 804 thrice.

In an embodiment, the numerical weights assigned to graph edges can be formulated as a function of one or more factors. Examples of the one or more factors can be, but are not limited to, a click back time after a sharing event, a category information of URLs associated with an edge associating two nodes, a total number of shares for a sharer, a total number of clicks for a clicker, a sharing channel, and a clicking channel.

The method of assigning numerical weights to the graph edges can be advantageous as it provides the opportunity to leverage the weighted graph by adding threshold values. Further, it helps in achieving more confidence in representing the relationship between the sharers and the clickers and renders the weighted graph more reliable. The method of assigning numerical weights to graph edges as shown in FIG. 8 is an example annotation.

In an embodiment, the sharing graph 300 can include various types of annotations on the nodes and edges. Various types of annotations include, but are not limited to, labels, metadata, weights on edges other than frequency, user interest topics, category information of the edges etc.

Figure 9:
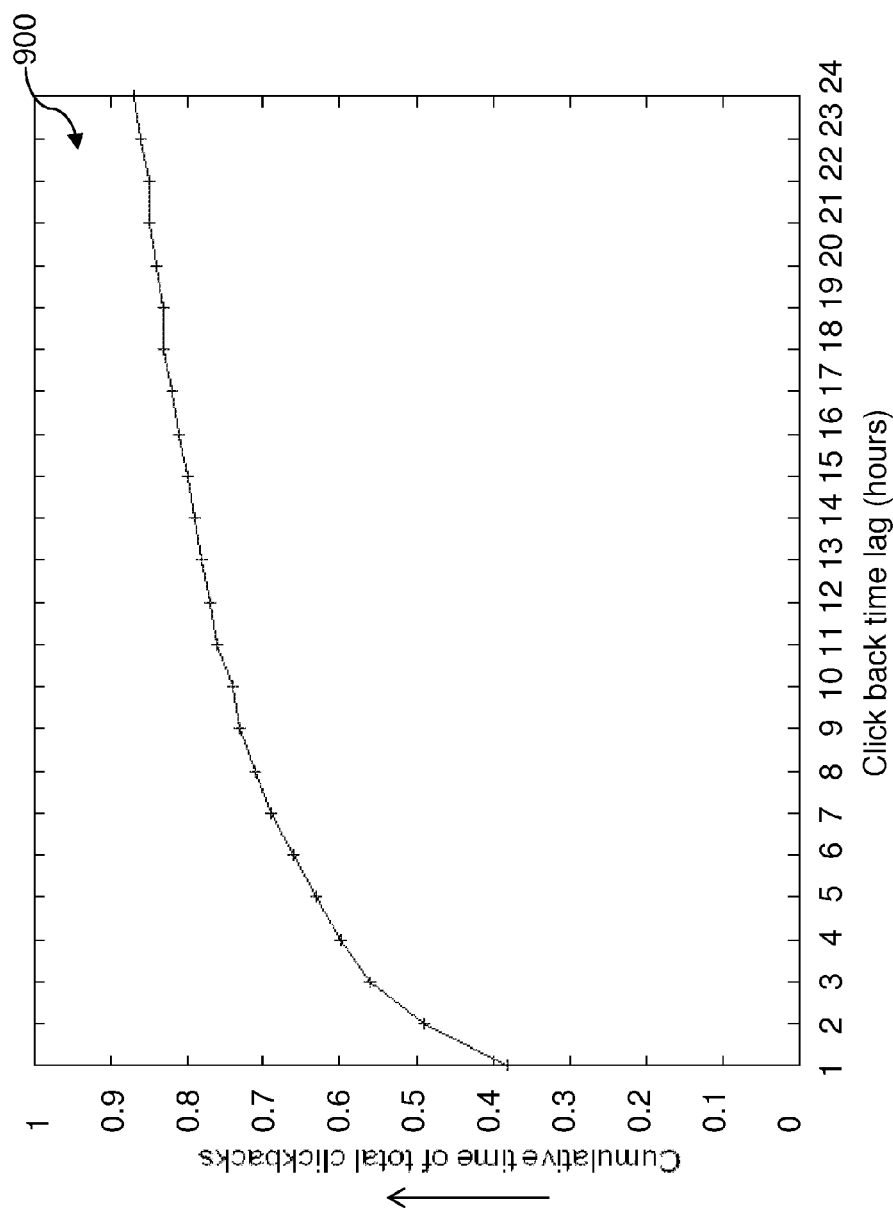
FIG. 9 illustrates a graph showing a click back time within first day of a shared content in accordance with an embodiment.

FIG. 9 illustrates a graph 900 showing a click back time within a first day of a shared content, in accordance with an embodiment. The graph 900 has the X-axis representing a click back time lag represented in hours and the Y-axis representing cumulative percentage of total click backs. It is evident from the graph 900 that as the number of hours increases, the cumulative percentage of total click backs increases.

In an embodiment, graph 900 illustrates a likelihood of the users to respond to a sharing event within the first 24 hours. It is evident from the graph 900 that approximately 40% of click backs happen within the first hour of a time of occurrence of the sharing event. Further, the graph 900 shows that 90% of click backs happen within the first 24 hours of the time of occurrence of the sharing event. Therefore, it can be inferred from graph 900 that most users are likely to click back a shared content within the first day of the sharing event.

In another embodiment, graph 900 can be interpreted to provide heuristics for disambiguating the relationship between the sharer and/or the clicker as shown in the block 606 (refer to FIG. 6*b*) and 702 (refer to FIG. 7). In an embodiment, if 90% of the click backs happen within the first 24 hours, then any clicks that happen after 24 hours of the time of occurrence of the sharing event can be assigned a lower confidence weight accordingly.

Figure 10A:
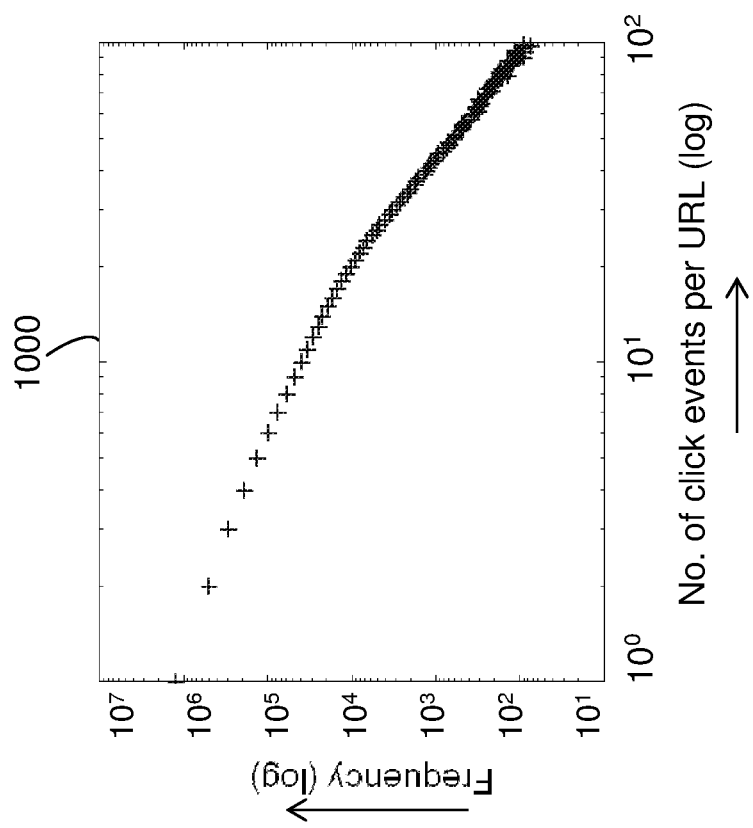
FIG. 10*a* shows statistics of an average number of click events associated with a URL for a first mapping between an anchor and a user in accordance with an embodiment.

FIG. 10*a* shows statistics of average number of click events associated with a URL for the first mapping between the anchor and the user, in accordance with an embodiment. The statistics 1000 has a log representation of the number of click events per URL denoted in the x-axis and a log representation of the frequency of an occurrence of the click event denoted in the y-axis. It can be inferred from the statistics 1000 that as the number of click events per URL increases, the frequency of occurrence of the click event decreases. For example, let us consider the URL as http://www.google.com. The frequency of the number of times the URL was clicked once is higher than the frequency of the number of times the URL was clicked several times.

In an embodiment, it can be inferred from statistics 1000 that the majority of URLs will be clicked on no more than 10 times. However, there can be instances where some popular URLs may be clicked on 100 times or more. The statistics 1000 shows only up to 100 clicks per URL.

Figure 10B:
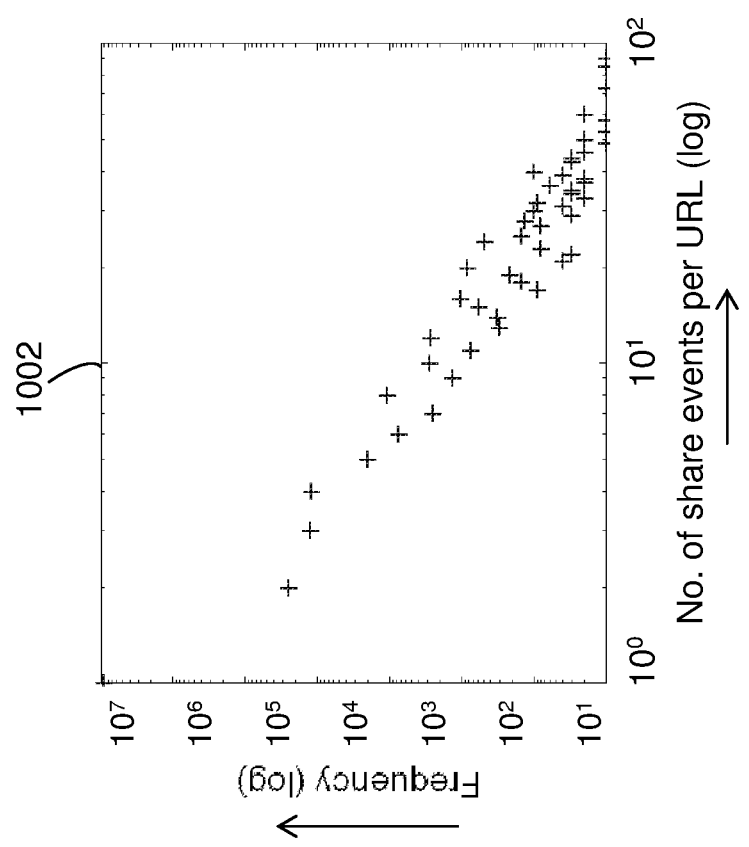
FIG. 10*b* shows statistics of an average number of share events associated with a URL for a first mapping between an anchor and a user in accordance with an embodiment.

FIG. 10*b* shows statistics of average number of share events associated with a URL for the first mapping between the anchor and the user, in accordance with an embodiment. The statistics 1002 has a log representation of number of share events per URL denoted in the x-axis and a log representation of frequency of an occurrence of the share event denoted in the y-axis. It could be inferred from the statistics 1002 that as the number of share events per URL increases, the frequency of occurrence of the share event decreases. For example, let us consider the URL as http://www.google.com. The frequency of the number of times the URL was shared once is higher than the frequency of the number of times the URL was shared several times.

In an embodiment, it can be inferred from statistics 1002 that the majority of URLs are shared no more than 10 times.

However, there may be instances where some popular URLs may be shared 100 times or more.

Figure 11A:
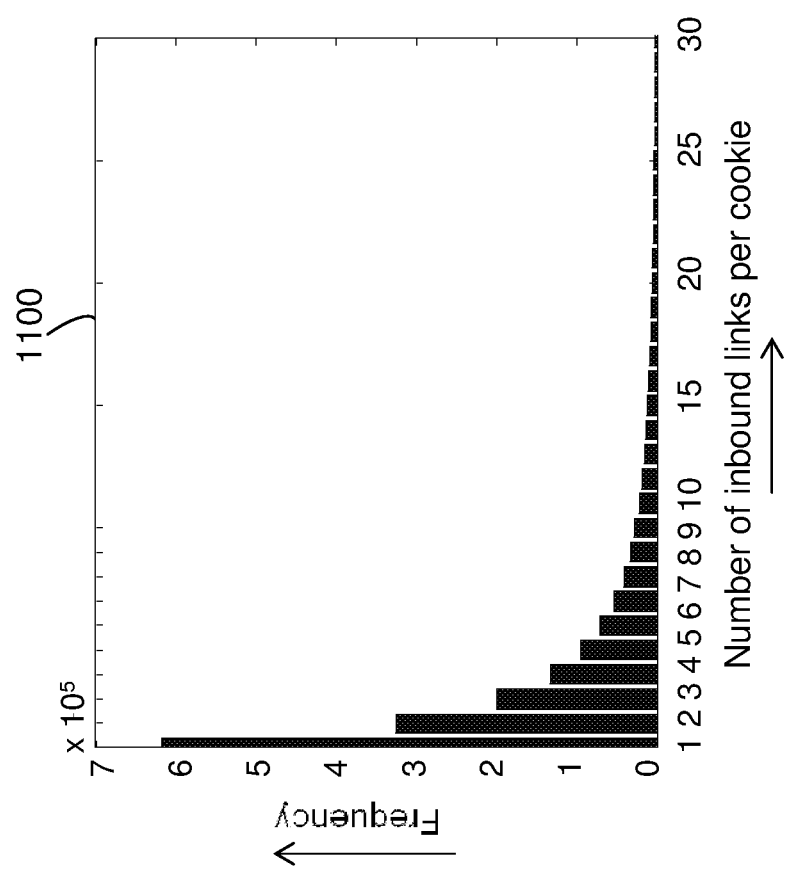
FIG. 11*a* shows statistics of number of inbound clicks associated with a user for a second mapping between a plurality of users in accordance with an embodiment.

FIG. 11a shows statistics of the number of inbound clicks associated with a user for the second mapping between the plurality of users, in accordance with an embodiment. The statistics 1100 shows the number of inbound links per cookie denoted in the x-axis and the frequency of occurrence of the event denoted in the y-axis. It could be interpreted from the statistics 1100 that as the number of inbound links per cookie increases, the frequency of occurrence of the event decreases.

Figure 11B:
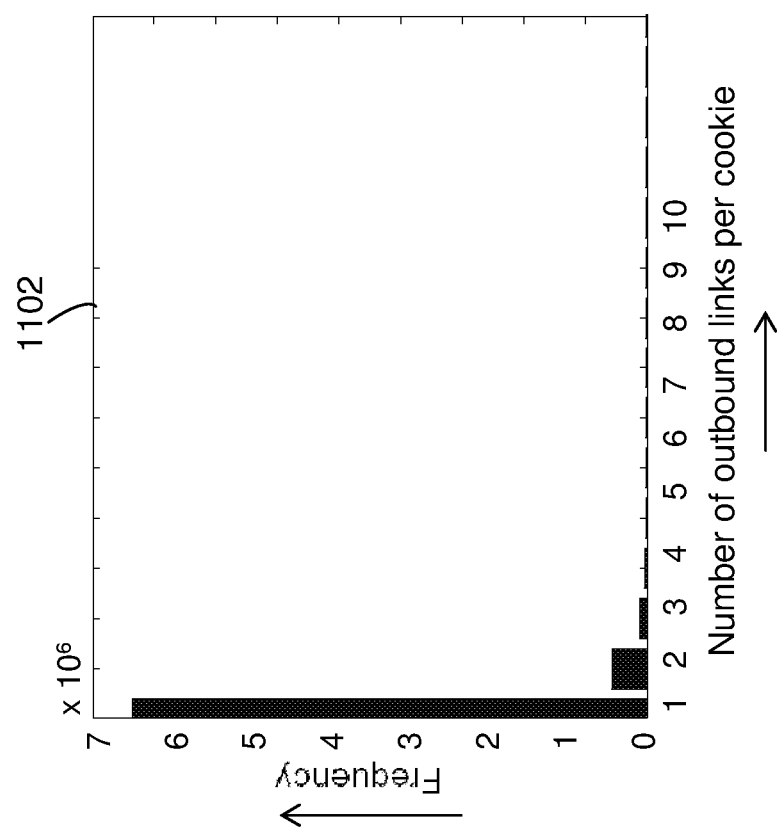
FIG. 11*b* shows statistics of number of outbound clicks associated with a user for a second mapping between a plurality of users in accordance with an embodiment.

FIG. 11b shows statistics of the number of outbound clicks associated with a user for the second mapping between the plurality of users, in accordance with an embodiment. The statistics 1102 shows the number of outbound links per cookie denoted in the x-axis and the frequency of occurrence of the event denoted in the y-axis. It could be interpreted from the statistics 1102 that as the number of outbound links per cookie increases, the frequency of occurrence of the event decreases.

FIG. 12 illustrates a method of constructing a social structure incrementally in accordance with an embodiment. FIG. 12 is explained in conjunction with FIG. 1 and FIG. 4. In an embodiment, step 1202 is similar in functionality to step 402 (refer FIG. 4). At step 1202, log records are received from a tracking application at a pre-determined time window T2. In an embodiment, step 1204 is similar in functionality to the step 404 (refer to FIG. 4). At step 1204, a first mapping between plurality of anchors and plurality of users is determined at the pre-determined time window T2. At step 1208, a pre-determined first mapping up to a pre-determined time window T1 at step 1206 and the determined first mapping between plurality of anchors and plurality of users at step 1204 are merged together. Social structure manager 106 (refer to FIG. 1) performs the process of merging anchor and user mappings. Finally, at step 1210, which is similar in functionality to step 406 (refer to FIG. 4), a second mapping between the plurality of users is determined. The process of determination of the second mapping corresponds to the construction of the social structure, such as a sharing graph.

FIG. 13 illustrates an alternative method of constructing a social structure incrementally in accordance with yet another embodiment. In an embodiment, step 1302 is similar in functionality to step 402 (refer to FIG. 4). Step 1304 is similar in functionality to the step 404 (refer to FIG. 4). Further, step 1306 is similar in functionality to the step 406 (refer to FIG. 4). The steps 1302, 1304 and 1306 are performed at a pre-determined time window T2. At step 1310, a pre-determined second mapping determined at step 1308 at a pre-determined time window T1 is merged with the determined second mapping at step 1306. Social structure manager 106 (refer to FIG. 1) performs the process of merging multiple second mappings in step 1310. In an embodiment, the multiple second mappings merged at step 1310 corresponds to the social structure, such as a social graph.

In an example implementation, the user visits a web page www.x11y22z33.com that displays content related to car sales in a particular geographical region. The content categorization module 214 categorizes the content on the website and categorizes it as a category named "automotive". In an embodiment, the categorized content could further be categorized as "sales" under the category "automotive". Further, the user activity module 216 determines the activity of the user, which in this case is viewing the web page. The user activity module 216 stores the corresponding user activity as the user activity data 230. Further, the anchor module 218 determines the anchor, such as the shortened URL associated with the web page based on the user activity of viewing the web page. The determined anchor is stored as anchor data 232. Further, the user mapping module 220 determines the first mapping based on the shortened URL and the user activity of the user viewing the web page, and the first mapping is stored as user mapping data 234. Furthermore, the social structure manager 106 gathers the user mapping data 234, and determines the second mapping that uncovers the relationship between the users, basically, the sharer and the clicker. The second mapping corresponds to the social structure.

One of the advantages of incrementally constructing a social structure as shown in FIGS. 12 and 13 is that an updated social structure need not be built from scratch. An existing social structure could be updated with new data to form an updated social structure by leveraging a timestamp. For example, grouping share and click cookies by URL (refer to FIG. 5) every day in a week would result in seven different URL graphs. In other words, there would be seven different daily URL graphs, also referred to as a weekly URL graph. In order to incrementally construct the social structure, a daily URL graph of day 8 is merged with the weekly URL graph. The resultant structure is the updated social structure.

The disclosed methods and systems, as described in the ongoing description or any of its components, may be embodied in the form of a computer system. Typical examples of a computer system includes, but are not limited to, a general-purpose computer, a programmed microprocessor, a microcontroller, a peripheral integrated circuit element, and other devices or arrangements of devices that are capable of implementing the steps that constitute the method of the present invention.

The computer system comprises a computer, an input device, and a display unit. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or any other similar device, which enables the computer system to connect to databases and networks, such as LAN, MAN, WAN and the Internet. The computer system facilitates inputs from a user through input device, accessible to the system through an I/O interface.

The computer system executes a set of instructions that are stored in one or more storage elements in order to process input data. The storage elements may also hold data or other information as desired. The storage element may be in the form of an information source or a physical memory element present in the processing machine.

The programmable or computer readable instructions may include various commands that instruct the processing machine to perform specific tasks such as the steps that constitute the method of the present invention. The method and systems described can also be implemented using only software programming or using only hardware or by a varying combination of the two techniques. The disclosed invention is independent of the programming language used and the operating system in the computers. The instructions for the invention can be written in all programming languages including, but not limited to 'C', 'C++', 'Visual C++', 'Visual Basic', Java and python. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine. The invention can also be implemented in all operating systems and platforms including, but not limited to, 'Unix', 'Windows Operating System', 'Android', 'Mac OS', and 'Linux'.

The programmable instructions can be stored and transmitted on computer readable medium. The programmable instructions can also be transmitted by data signals across a carrier wave. The disclosed invention can also be embodied in a computer program product comprising a computer readable medium, the product capable of implementing the above methods and systems, or the numerous possible variations thereof.

While various embodiments have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for determining a social relationship between a sharer and a clicker of a plurality of users accessing a plurality of web pages, wherein the social relationship between the sharer and the clicker is explicitly not defined, the method comprising:

receiving at least one log record from a tracking component located on the plurality of web pages, the at least one log record corresponding to one or more activities of the plurality of users on the plurality of web pages, wherein the sharer shares an information entity on the plurality of web pages and the clicker clicks on the information entity shared by the sharer;

determining a first mapping between a plurality of anchors on the plurality of web pages and the plurality of users based on the corresponding one or more activities, the plurality of anchors being utilized to perform the one or more activities, wherein the activities include sharing activities and click-based activities, and wherein the sharing activities and the click-based activities having corresponding timestamps are performed on a web page of the plurality of web pages;

determining a second mapping between the sharer and the clicker based on the first mapping during a first pre-determined time window, wherein the second mapping represents a social relationship between the sharer and the clicker when the sharer and the clicker perform the corresponding sharing and click-based activities on an anchor of the plurality of anchors of the web page, and wherein the clicker performs the click-based activity after the sharer performs the sharing activity;

generating a sharing graph which comprises a plurality of nodes and a plurality of edges connecting the plurality of nodes, wherein the sharing graph is a visual representation of the social relationship, wherein the plurality of nodes correspond to the plurality of users and the plurality of edges correspond to the plurality of anchors, wherein the plurality of edges have corresponding numerical weights, social channel labels, and timestamp labels assigned thereto, wherein the sharing graph is pruned based on the numerical weights, and wherein the sharing graph corresponds to a graphical representation of links prevailing among the plurality of users, the links indicating that the social relationship is based on at least one of similar interest, proximity of locations, and communication connections.

2. The method of claim 1, further comprising installing a tracking application in a domain web server hosting the plurality of web pages.

3. The method of claim 1, wherein the one or more activities of the plurality of users further include one of: viewing a web page and sharing through the tracking component.

4. The method of claim 1, further comprising updating the sharing graph based on the timestamps.

5. The method of claim 1, wherein determining the first mapping further comprises incrementally constructing a pre-determined first mapping after a second pre-determined time window.

6. The method of claim 1, wherein determining the second mapping further comprises incrementally constructing a pre-determined second mapping after a third pre-determined time window.

7. The method of claim 1, wherein the tracking component comprises one or more of: a widget, a button, a hypertext, a web beacon, and a link on the plurality of web pages.

8. The method of claim 1, wherein the plurality of anchors comprises one or more of: a shortened unified resource locator (URL), an event tracking URL, a shared URL, a copy and paste text snippet, and an interest topic.

9. The method of claim 1, further comprising categorizing one or more content on the plurality of web pages, associated with the at least one log record, into one or more content categories, wherein the categorization is based on the at least one log record.

10. The method of claim 9, wherein the first mapping is based on the one or more activities and the one or more content categories.

11. The method of claim 1, wherein the at least one log record comprises one or more of: an anonymous cookie representing at least one of the sharer and the clicker, a timestamp, an event type, a sharing channel, a content identifier, domain information, and a browser agent.

12. The method of claim 1, further comprising annotating the plurality of nodes and the plurality of edges with metadata information, wherein the metadata information comprises one or more of: a user interest, a user activity, category information of the plurality of anchors, a click back time after the sharing activity, a total number of shares, a total number of clicks, a sharing channel, and a clicking channel.

13. A system for determining a social relationship between a sharer and a clicker of a plurality of users accessing a plurality of web pages, wherein the social relationship between the sharer and the clicker is explicitly not defined, the system comprising one or more processors configured to:

receive at least one log record corresponding to one or more activities of the plurality of users on the plurality of web pages, wherein the sharer shares an information entity on the plurality of web pages and the clicker clicks on the information entity shared by the sharer;

determine a first mapping between a plurality of anchors on the plurality of web pages and the plurality of users based on the corresponding one or more activities, the plurality of anchors being utilized to perform the one or more activities, wherein the activities include sharing activities and click-based activities, and wherein the sharing activities and the click-based activities having corresponding timestamps are performed on a web page of the plurality of web pages;

determine a second mapping between the sharer and the clicker based on the first mapping during a first predetermined time window, wherein the second mapping represents a social relationship between the sharer and the clicker when the sharer and the clicker perform corresponding sharing and click-based activities on an anchor of the plurality of anchors of the web page, and wherein the clicker performs the click-based activity after the sharer performs the sharing activity; and generate a sharing graph which comprises a plurality of nodes and a plurality of edges connecting the plurality of nodes, wherein the sharing graph is a visual representation of the social relationship, wherein the plurality of nodes correspond to the plurality of users and the plurality of edges correspond to the plurality of anchors, wherein the plurality of edges have corresponding numerical weights, social channel labels, and timestamp labels assigned thereto, wherein the sharing graph is pruned based on the numerical weights, and wherein the sharing graph corresponds to a graphical representation of links prevailing among the plurality of users, the links indicating that the social relationship is based on at least one of similar interest, proximity of locations, and communication connections.

14. The system of claim 13, wherein the one or more processors are further configured to manage a subscription of a plurality of domain web servers to the system, the plurality of domain web servers hosting the plurality of web pages.

15. The system of claim 13, wherein the one or more processors are further configured to determine the one or more activities of the plurality of users on the plurality of web pages based on the at least one log record.

16. The system of claim 13, wherein the one or more processors are further configured to categorize content on the plurality of web pages into one or more content categories.

17. The system of claim 13, wherein the plurality of anchors comprises one or more of: a shortened unified resource locator (URL), an event tracking URL, a shared URL, a copy and paste text snippet, and an interest topic.

18. The system of claim 13, wherein the at least one log record comprises one or more of: an anonymous cookie representing at least one of the sharer and the clicker, a timestamp, an event type, a sharing channel, a content identifier, domain information, and a browser agent.

19. The system of claim 13, further comprising annotating the plurality of nodes and the plurality of edges with metadata information, wherein the metadata information comprises one or more of: a user interest, a user activity, category information of the plurality of anchors, a click back time after the sharing activity, a total number of shares, a total number of clicks, a sharing channel, and a clicking channel.

20. A computer program product for use with a computer, the computer program product comprising a non-transitory computer usable medium having a computer readable program code embodied therein for determining a mapping between a plurality of users accessing a plurality of web pages, the computer readable program code comprising a set of instructions for:

receiving at least one log record from a tracking component located on the plurality of web pages, the at least one log record corresponding to one or more activities of the plurality of users on the plurality of web pages, wherein the sharer shares an information entity on the plurality of web pages and the clicker clicks on the information entity shared by the sharer;

determining a first mapping between a plurality of anchors on the plurality of web pages and the plurality of users based on the corresponding one or more activities, the plurality of anchors being utilized to perform the one or more activities, wherein the activities include sharing activities and click-based activities, and wherein the sharing activities and the click-based activities having corresponding timestamps are performed on a web page of the plurality of web pages;

determining a second mapping between the sharer and the clicker based on the first mapping during a first predetermined time window, wherein the second mapping represents a social relationship between the sharer and the clicker when the sharer and the clicker perform corresponding sharing and click-based activities on an anchor of the plurality of anchors of the web page, and wherein the clicker performs the click-based activity after the sharer performs the sharing activity; and generating a sharing graph which comprises a plurality of nodes and a plurality of edges connecting the plurality of nodes, wherein the sharing graph is a visual representation of the social relationship, wherein the plurality of nodes correspond to the plurality of users and the plurality of edges correspond to the plurality of anchors, wherein the plurality of edges have corresponding numerical weights, social channel labels, and timestamp labels assigned thereto, wherein the sharing graph is pruned based on the numerical weights, and wherein the sharing graph corresponds to a graphical representation of links prevailing among the plurality of users, the links indicating that the social relationship is based on at least one of similar interest, proximity of locations, and communication connections.

21. The computer program product of claim 20, wherein the plurality of anchors comprises one or more of: a shortened unified resource locator (URL), an event tracking URL, a shared URL, a copy and paste text snippet, and an interest topic.

22. The computer program product of claim 20, wherein the at least one log record comprises one or more of: an anonymous cookie representing at least one of the sharer and the clicker, a timestamp, an event type, a sharing channel, a content identifier, domain information, and a browser agent.

23. The computer program product of claim 20, further comprising annotating the plurality of nodes and the plurality of edges with metadata information, wherein the metadata information comprises one or more of: a user interest, a user activity, category information of the plurality of anchors, a click back time after the sharing activity, a total number of shares, a total number of clicks, a sharing channel, and a clicking channel.

* * * * *